(12) United States Patent
Schneider et al.

(10) Patent No.: US 8,998,773 B2
(45) Date of Patent: Apr. 7, 2015

(54) METHOD FOR CONTROLLING SHIFTING OF A PARTIAL DOUBLE CLUTCH TRANSMISSION

(75) Inventors: Florian Schneider, Lindenberg (DE); Roland Mair, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 239 days.

(21) Appl. No.: 13/877,364

(22) PCT Filed: Sep. 14, 2011

(86) PCT No.: PCT/EP2011/065924
§ 371 (c)(1),
(2), (4) Date: Apr. 2, 2013

(87) PCT Pub. No.: WO2012/048977
PCT Pub. Date: Apr. 19, 2012

(65) Prior Publication Data
US 2013/0203555 A1    Aug. 8, 2013

(30) Foreign Application Priority Data
Oct. 11, 2010    (DE) .......... 10 2010 042 267

(51) Int. Cl.
*B60W 10/00*    (2006.01)
*B60W 10/02*    (2006.01)
(Continued)

(52) U.S. Cl.
CPC ........... *B60W 10/02* (2013.01); *Y10T 477/6418* (2013.01); *F16H 37/043* (2013.01); *F16H 61/688* (2013.01); *F16H 61/702* (2013.01); *F16H 63/502* (2013.01); *B60W 10/06* (2013.01)

(58) Field of Classification Search
CPC ..... B60W 10/02; B60W 10/06; F16H 61/688; F16H 61/702; F16H 63/502; F16H 37/043; Y10T 477/6418
See application file for complete search history.

(56) References Cited

U.S. PATENT DOCUMENTS

| 4,966,048 | A  | 10/1990 | Braun |
| 2008/0134834 | A1 | 6/2008 | Gitt et al. |

(Continued)

FOREIGN PATENT DOCUMENTS

| DE | 102 32 832 A1 | 2/2004 |
| DE | 10 2005 033 027 A1 | 1/2007 |

(Continued)

OTHER PUBLICATIONS

German Search Report Corresponding to DE 10 2010 042 267.3.
(Continued)

*Primary Examiner* — Justin Holmes
(74) *Attorney, Agent, or Firm* — David & Bujold, PLLC; Michael J. Bujold (57) ABSTRACT

A method of controlling shifting in a transmission having a first partial transmission, designed as a dual-clutch transmission, which comprises first and second clutches by which the dual-clutch transmission can be functionally connected to a turbocharged internal combustion engine. A second partial transmission is arranged in the drive-train, downstream of the dual-clutch transmission, which is in the form of a main transmission that shifts with traction force interruption. To at least reduce traction power loss of the turbocharged engine after a traction shift, during a traction shift involving a gearshift in the main transmission, the clutches are at least partially engaged so as to be braced against one another and produce a torque that acts in opposition to the drive engine by virtue of which, during the traction shift, the supercharge pressure of the drive engine is largely maintained, or at least built up shortly after the traction shift.

16 Claims, 3 Drawing Sheets

(51) Int. Cl.
*F16H 61/688* (2006.01)
*F16H 61/70* (2006.01)
*B60W 10/06* (2006.01)
*F16H 37/04* (2006.01)
*F16H 63/50* (2006.01)

(56) References Cited

U.S. PATENT DOCUMENTS

2011/0263383 A1* 10/2011 Ostberg et al. ............... 477/174
2011/0264339 A1* 10/2011 Wang et al. ..................... 701/53

FOREIGN PATENT DOCUMENTS

| DE | 10 2008 008 496 A1 | 8/2009 |
| DE | 10 2010 028 076 A1 | 10/2011 |
| EP | 1 624 232 A1 | 2/2006 |
| FR | 2 821 802 A1 | 9/2002 |

OTHER PUBLICATIONS

International Search Corresponding to PCT/EP2011/065924.
Written Opinion Corresponding to PCT/EP2011/065924.

* cited by examiner

METHOD FOR CONTROLLING SHIFTING OF A PARTIAL DOUBLE CLUTCH TRANSMISSION

This application is a National Stage completion of PCT/EP2011/065924 filed Sep. 14, 2011, which claims priority from German patent application serial no. 10 2010 042 267.3 filed Oct. 11, 2010.

FIELD OF THE INVENTION

The invention concerns a method for controlling shifting of a partial double clutch transmission.

BACKGROUND OF THE INVENTION

For reasons of comfort and performance automated transmissions that can be powershifted are increasingly used in utility vehicles. In this context double clutch transmissions that shift without traction force interruption are particularly attractive. Such automated change-speed transmissions comprise an intermediate transmission or a number of intermediate transmission groups connected one after another, and if necessary a downstream planetary transmission. The gears in a classical double clutch transmission are divided into two transmission branches, a direct and an indirect gear group, wherein each group is associated with one clutch of the double clutch. With the help of the double clutch a sequential shift sequence almost free from traction force interruption can be carried out, wherein in each case the next gear is preselected in the currently load-free transmission branch and the gearshift takes place by overlapped actuation of the two clutches. The force flow of the gears can pass conventionally by way of a drive input shaft and a drive output shaft, or it can meander through the transmission via a plurality of changing shafts.

Compared with a pure powershifting automatic transmission of planetary design, automated transmissions have efficiency and cost advantages. However, as the number of gears increases so too do the structural size, the design complexity and hence the manufacturing costs. Since, depending on their field of use, utility vehicles as a rule need a relatively large number of gears in order to achieve a given transmission spread and for efficient operation, it is expedient particularly for utility vehicle applications also to consider less expensive and more compactly configured mixed transmission forms, so-termed partial double clutch transmissions, in which besides a powershifting transmission or transmission section with a double clutch, a conventional transmission section, i.e. one which shifts with traction force interruption, for example a main transmission group or a downstream transmission that shifts with traction force interruption, such as a transfer box or axle transmission, is provided. Depending on the shift carried out, these partial double clutch transmissions behave like a conventional change-speed transmission, i.e. with the disadvantage of a traction force interruption if the gearshift takes place in the main transmission section or like a power-shift transmission if the gearshift takes place in the double clutch transmission section.

For example, DE 10 2008 008 496 A1 describes a multi-stage transmission which corresponds in function to a partial double clutch transmission. The multi-stage transmission has a first and a second input shaft which, by means of the respective clutches of a double clutch, can be connected to a drive engine, and a countershaft to which the two input shafts are coupled by way of a first or a second input gearset with different gear ratios. A drive output shaft can be coupled selectively via various other gearsets to the countershaft. A two-directional gearshift between a first and a second gear can be carried out without traction force interruption and without further shifting processes by overlapped opening and closing of the two clutches, since the force flow in those gears only changes between the first and second gearset but passes on to the drive output by way of the same other gearset. The other gearshifts require a shift of the gear clutches involved, with the consequence of a traction force interruption.

The comfort and performance deteriorations caused by a gearshift with traction force interruption are made even worse by the loss of supercharge pressure in turbocharged internal combustion engines. Exhaust gas turbochargers are used with most diesel engines and more recently in many Otto engines as well. An exhaust gas turbocharger has a turbine which makes use of the kinetic energy contained in the exhaust gas for driving a compressor which, for its part, draws in fresh air and passes it, after pre-compression, to the cylinders of the engine to boost its power. It is therefore driven by the exhaust gas flow, without any direct relationship to the engine speed. With a correspondingly high driving resistance, in addition to the speed loss caused by shifts with traction force interruption, insufficient turbocharging brings about a loss of traction power which, when a powerful acceleration is required in the lower engine speed range, is generally referred to as turbo lag. Thus, if the supercharge pressure of the supercharger first has to be built up, the suction torque needed for reaching the full-load torque of the engine is only available above a limiting supercharging speed. Since the quantity of air delivered is approximately proportional to the square of the supercharging speed, the time interval after an upshift under load between reaching the suction torque and the engine torque attainable when stationary is clearly perceptible as a traction power loss. Particularly in the case of utility vehicle diesel engines this time interval, and thus the transition into the supercharged operating range, is often particularly long.

When a shift process takes place in the conventional section of the transmission, partial double clutch transmissions are as much affected by this problem as any conventional automated transmission. To avoid turbo lag, it is true that electrical or mechanical auxiliary drives of the exhaust gas turbocharger or auxiliary compressors are known, which are designed to increase the supercharge pressure if the engine is providing insufficient supercharging energy. These devices, however, are relatively expensive and take up additional structural fitting space.

From the previously unpublished patent application DE 10 2010 028 076.3 a method is known for controlling shifts in an automated change-speed transmission with an upstream hydrodynamic starting and braking element, by means of which during a traction shift the occurrence of a traction power loss of a turbocharged drive engine while the load is building up after the shift, can be avoided. In this case a hydrodynamic torque converter with a pump impeller wheel, a turbine wheel and a guide wheel, or a hydrodynamic clutch in the absence of a guide wheel, is provided, wherein by way of a bridging clutch the pump impeller can be connected to an intermediate shaft itself connected to a transmission input shaft, and the turbine wheel can be connected to the intermediate shaft by a freewheel clutch and can be braked relative to a fixed housing by means of a turbine brake. The load is reduced for disengaging the gear at the beginning of the traction shift while maintaining the engine torque delivered by the drive engine by building up a correspondingly high resistance torque, in that the turbine brake is at least partially closed and the torque transmitted by the starting and braking element to the turbine brake is adjusted to the engine torque of the drive engine. In this way the gear can be disengaged while largely free from torque. After the synchronization and engagement of the target gear, the turbine brake is opened again so that the load corresponding to the new gear is applied to the engine. Since the engine torque is not reduced in order to decrease the load, the disturbing drop of the engine torque delivered spontaneously under load by the turbocharged drive engine does not take place.

In the known method the effect of turbo lag is reduced by means of a hydrodynamic converter or its turbine brake. But in a partial double clutch transmission no such starting and braking element is present, but instead, a double clutch is provided. Accordingly the known method cannot be applied to the problem of turbo lag during a shifting process in a partial double clutch transmission.

SUMMARY OF THE INVENTION

Against this background the purpose of the present invention is to propose a method for controlling shifts in a partial double clutch transmission, with which in an inexpensive manner, traction power loss of a turbocharged drive engine after a traction shift can be avoided or its undesired effect can at least be reduced considerably.

The invention is based on the recognition that in transmissions that comprise a powershifting double clutch transmission section and a downstream conventional transmission section which shifts with traction force interruption, during a gearshift in the conventional transmission section the double clutch can be used, by building up a bracing torque, to produce a load torque against which the torque of a drive engine in the form of a turbocharged internal combustion engine is supported. The bracing torque should be used for load compensation at the drive engine and/or for reducing the load in the conventional transmission section. In particular, during the shift the supercharge pressure of an exhaust gas turbocharger should be maintained above a limit value or, immediately after the transmission has been shifted to neutral in the conventional section, built up again in a short time. At the same time, by means of the double clutch the target gear in the conventional transmission section should be synchronized. Thus, in the new gear the occurrence of the perceptible turbo lag can be prevented.

Accordingly, the invention starts from a method for controlling shifts in a partial double clutch transmission, for example that of a utility vehicle, with a first transmission section designed as a double clutch transmission having a double clutch that comprises a first clutch and a second clutch, by way of which the double clutch transmission can be functionally connected to a drive engine in the form of a turbocharged internal combustion engine, and with a second transmission section arranged downstream from the double clutch transmission in a drive-train, which is designed as a main transmission which shifts with traction force interruption. To achieve the stated objective the invention provides that during a traction shift involving a gearshift in the main transmission, the first clutch and the second clutch are at least partially closed so that they are braced against one another, whereby a torque acting in opposition to the drive engine is produced, by virtue of which the supercharge pressure of the drive engine during the traction shift is largely maintained or at least is built up within a short time of the traction shift.

The method can be used to good advantage both with arrangements that comprise a transmission with a double clutch transmission section on the engine side and a downstream conventional transmission section, i.e. one that shifts with traction force interruption, and also with arrangements comprising a complete double clutch transmission and a downstream conventional transmission, for example a shiftable transfer box or axle transmission. With each of the two clutches of the double clutch transmission or double clutch transmission section is associated a one-gear or multi-gear double clutch transmission branch. In what follows, 'double clutch transmission' is understood to mean both a complete transmission and a transmission section. 'Main transmission' is understood to mean a transmission or transmission section downstream from the double clutch transmission or double clutch transmission section in the force flow, and whose design corresponds to that of a classical multi-stage transmission which can be made as unsynchronized with claw shifting elements or as synchronized with synchronizer packets.

The method is only needed for traction shifts, i.e. traction upshifts or traction downshifts, since the avoidance of turbo lag is only necessary during traction operation whereas in thrust operation the drag torque of the drive engine is active.

By means of the method according to the invention the disadvantageous effects of turbo lag during shifts in the conventional transmission section in the case of a partial double clutch transmission are largely avoided. Rather, in contrast to the usual, sluggish response behavior of the drive system after a traction shift, a sufficient torque is provided directly, whereby better performance and greater shifting comfort are achieved. Consequently, in particular shifts in difficult driving situations, such as on uphill slopes while carrying a heavy load or progressing rapidly onto an expressway, are enabled or made easier. Basically, in the case of traction upshifts larger gear intervals are also possible, since by virtue of the already present supercharge pressure lower connecting rotational speeds in the drive can be realized at the vehicle's wheels. Thus, the method according to the invention makes it possible for a utility vehicle transmission in particular to be designed as a comparatively inexpensive and compactly configured partial double clutch transmission, which to a large extent retains the comfort advantages of a pure powershift transmission or double clutch transmission.

To build up a bracing torque in the double clutch, one of the two clutches is preferably operated in an engaged condition and the other of the two clutches in a slipping condition. In this way a load torque is applied to the drive engine, which prevents the supercharge pressure from falling or which contributes toward building up a falling supercharge pressure again. With regard to the gear ratio situation in the double clutch transmission section, the engaged clutch must be or must remain closed at least far enough for it to transmit the applied bracing torque reliably. If the engaged clutch is also the load-supporting clutch in the new gear, then for simplicity it can even be or remain fully closed from beforehand. On the other hand, if the engaged clutch will not be the load-supporting clutch in the new gear, then it is favorable for the shifting sequence to close the engaged clutch during the shift only as far as necessary. Basically, it is also possible for both clutches to be operated with slip during the bracing. However, the simultaneous regulation of the two clutch torques in slipping operation in such manner so as to adjust the bracing torque to the engine torque is relatively difficult.

In a first embodiment of the method it can be provided that at the beginning of the shift the load in the main transmission is reduced by reducing the engine torque and if necessary opening the currently load-supporting clutch until the gear currently engaged in the main transmission can be disengaged while largely free from load. Thereafter the load at the internal combustion engine is reduced in the usual manner, whereby the supercharge pressure of the turbocharger begins falling. The current gear can be disengaged when freedom from torque is approached or reached. Immediately after the gear has been disengaged the double clutch is braced, whereby a torque opposing the drive engine is produced and a speed adaptation for producing synchronous rotation at the components of the gear to be engaged takes place. After this, as soon as the conventional transmission section is neutral, the engine is at once loaded by virtue of the bracing of the double clutch and this counteracts any further decrease of the supercharge pressure. At the same time, by virtue of the bracing of the two clutches the engine speed is adjusted so that, having regard to the gear ratio of the double clutch transmission, synchronization is established at the transmission input of the main transmission and thus at the loose wheel to be connected and the associated gear clutch of the target gear, which can be in the form of a claw clutch or a synchronous clutch. Once the new gear has been engaged when the target rotational speed is reached, the load is built up in the main transmission, i.e. in the drive-train as far as the driven vehicle wheels after the double clutch transmission section. Since at this point the engine is already under load by virtue of the double clutch, the bracing torque of the double clutch must be removed again. For this the bracing of the double clutch is released in that the load-supporting clutch in the new gear is or remains closed and the other clutch is fully opened.

This embodiment variant, in which the supercharge pressure loss is reduced since already during the transmission shift in the main transmission the engine is again loaded, is particularly well suited for comfort-orientated shifts, i.e. for shifts with the target criterion "shift with maximum comfort", in which that one of the two clutches which is load-supporting after the shift is already closed during the rotational speed adaptation or is in an engaged condition, so that no shifting jerks can occur due to additional clutch actuations. Furthermore, owing to the conventional load reduction by reducing the engine torque, the gear can be disengaged particularly simply and comfortably.

In a second embodiment of the method it can be provided that at the beginning of the shift a load reduction in the main transmission takes place, in that a torque acting in opposition to the drive engine is produced by bracing the double clutch, such that the currently non load-supporting one of the two clutches is brought to slipping operation and the currently load-supporting clutch remains closed or at least partially closed until the gear currently engaged in the main transmission can be disengaged while practically free from load. Then the load in the transmission is reduced, in that the engine torque is compensated by the bracing torque of the double clutch. In this way the torque in the drive-train after the double clutch transmission section is reduced until the gear in the conventional transmission section can be disengaged. Thus, during the shift the internal combustion engine remains permanently under load. This has the advantage that the supercharge pressure is largely maintained during the shift, so that turbo lag is almost completely avoided. The speed adaptation to obtain synchronization of the components of the gear to be engaged that have to be shifted, takes place analogously to the first embodiment variant. Only the starting time of the bracing torque or engine torque is different. The load build-up after the new gear has been engaged in the main transmission takes place again in that the load-supporting clutch in the new gear is or remains closed and the other clutch is fully opened.

This embodiment variant with a load reduction without loss of supercharge pressure is particularly suitable for performance-orientated shifts in which as short as possible a shifting time is desired, wherein the load-supporting clutch may change during the shift and a torque minimization sufficient for disengaging the gear in the main transmission is achieved by sufficiently accurate adjustment of the bracing torque to the engine torque.

Furthermore, it can be provided that the speed adaptation takes place independently of any synchronous shifting clutches in the main transmission. In this case the speed adaptation to the target gear in the main transmission is still carried out as with an unsynchronized gear. Correspondingly, the synchronous speed is adjusted actively, even if the gear clutch has mechanical synchronizing elements, since otherwise the synchronous clutch would have to be synchronized also with the drive engine and the load-supporting clutch in the new gear. The usual synchronous shifting packets are as a rule not designed for that and could therefore be overloaded. A more robust design of the synchronous clutch would entail additional costs.

During the speed adaptation, the speed of the target gear is set. At the same time the load on the internal combustion engine should be as large as possible in order to maintain the supercharge pressure of the turbocharger or build it up as quickly as possible. Since it is preferred to reach the target speed in an intelligent manner, during the speed adaptation it can be provided that the clutch torques are adjusted so that the target speed is reached with a desired or specified dynamic. When during the speed adaptation one clutch is closed and the other partially closed so that it is operating with slip, the slipping clutch determines the load torque acting on the drive engine. Accordingly, the slipping clutch is closed far enough to produce the desired rotational speed variation toward the target speed and, in relation to supercharge pressure, to load the engine sufficiently.

To produce as large as possible a load torque on the internal combustion engine and thereby achieve the best possible maintenance or build-up of the supercharge pressure of the turbocharger, it can be provided that by an engine control system a maximum possible fuel injection quantity is specified for the drive engine and the speed adaptation takes place only by regulating the bracing torque of the double clutch.

However, it is found in practice that the controllability of a double clutch is often not sufficient to enable a particular speed to be set with a desired accuracy without at the same time acting upon the engine. Thus, it can also be provided that by means of the engine control system a target speed is specified, and the bracing torque of the double clutch is varied in such manner that the target speed can be reached by means of the engine control system or with the help of a speed regulator which controls the fuel injection quantity. Accordingly, the engine load is reduced by regulating the double clutch just far enough for the speed regulator to be able to obtain the target speed reliably and with sufficient accuracy. During this the engine load is only slightly lower than the maximum possible load.

Since the result of bracing the double clutch is that in whichever clutch is slipping friction work is performed and the clutch is therefore loaded, it is appropriate not to carry out the method automatically for every traction shift, so as not to stress the clutches unnecessarily but only ever when the effects of turbo lag during a shift process are assessed as particularly damaging to performance or comfort and the clutch loading does not exceed a given amount.

Thus, it can be provided that the bracing of the double clutch relevant for the supercharge pressure during a traction shift always takes place if the driving resistance after the traction shift to the newly engaged gear, which is the sum of the vehicle's rolling resistance, the resistance due to road inclination, acceleration resistance and air resistance, would have an effect that exceeds the suction torque of the engine.

Were that to be the case, turbo lag could substantially restrict the drivability of the vehicle in the new gear.

It can also be provided that the supercharge-pressure-relevant bracing of the double clutch during a traction shift always takes place if a power demand indicated by a kickdown or an accelerator pedal position beyond a limit value exceeds a specified threshold value, i.e. in particular when the driver calls for maximum driving performance.

Moreover, it can be provided that the supercharge-pressure-relevant bracing of the double clutch during a traction shift always takes place if this is recognized as appropriate with reference to a predetermined measure of comfort or performance. A comfort or performance measure can be derived from a number of relevant current operating parameters, for example—in addition to the driving resistance and the driver's wishes—from the driving situation, the vehicle's mass, the road profile and what the vehicle is being used for. It may be that such a measure is in any event available for the control of other functions and can be used as an initiation criterion of the method according to the invention.

Furthermore, it can be provided that the supercharge-pressure-relevant bracing of the double clutch during a traction shift only takes place if, with a currently determined clutch load, a predetermined load reserve of at least one of the two clutches so permits. With the help of the target criterion "shift with maximum performance" or "shift with maximum comfort", it is advantageous to choose which clutch during the traction shift will be operated with slip and which in an engaged condition. Correspondingly, the current loading and the load reserve of the slipping clutch are first checked.

In each case the load reserve is chosen such that a critical load limit is never exceeded. In this way the double clutch can be reliably protected against premature wear. In the determination of the load reserve, in each case shortly to be expected subsequent uses of the clutch, such as load-intensive starting processes, maneuvering processes or multiple shift processes one after another can be taken into account. In addition the conditions of the surroundings at the time can be taken into account, as also can the type of use of the vehicle, for example long-distance driving or off-road driving. Thus, depending on the operating situation the load reserve can vary.

Since the two clutches can be designed differently, a load reserve check can be carried out individually for each clutch. In this, additional clutch-specific characteristics such as clutch mass, specific heat capacity, heat conductivity, fitting position and consequent cooling behavior are evaluated. If the load reserve of the clutch chosen as the slipping clutch is insufficient, the load reserve of the other clutch is checked and if appropriate that clutch is operated with slip.

If neither of the two clutches satisfies the load criteria, the method is not used. Advantageously, therefore, the supercharge-pressure-relevant bracing of the double clutch during a traction shift only takes place provided that a predicted relevant clutch loading is lower than a limit value or provided that a current clutch load increased by a predicted additional friction energy input is lower than a limit value. In this way the clutch bracing is used effectively and unnecessary friction energy inputs are avoided, so the clutch loading as a whole is kept low.

It has not yet been described how the clutches to be operated respectively with slip and in an engaged condition should be chosen in order to obtain the above-mentioned target criteria. Moreover, it has not been described which gear or gear combination should be engaged for the best possible realization of these target criteria in the double clutch transmission section, if one or both of the double clutch transmission branches contain more than one gear. A comparative consideration of the clutch torques, rotational speeds, gear ratios and mass moments of inertia has shown that owing to opposed influences of the two clutches, in a partial double clutch transmission system this cannot be determined in any simple manner, but has to be deduced in each case depending on the operating situation. For this, reference should be made to another patent application by the present applicant, whose object is the reduction of the effects of a traction force interruption in the conventional transmission section of a partial double clutch transmission.

BRIEF DESCRIPTION OF THE DRAWINGS

To clarify the invention the description of the drawings illustrating example embodiments are attached. The drawings show.

DETAILED DESCRIPTION OF THE PREFERRED EMBODIMENTS

Figure 1:
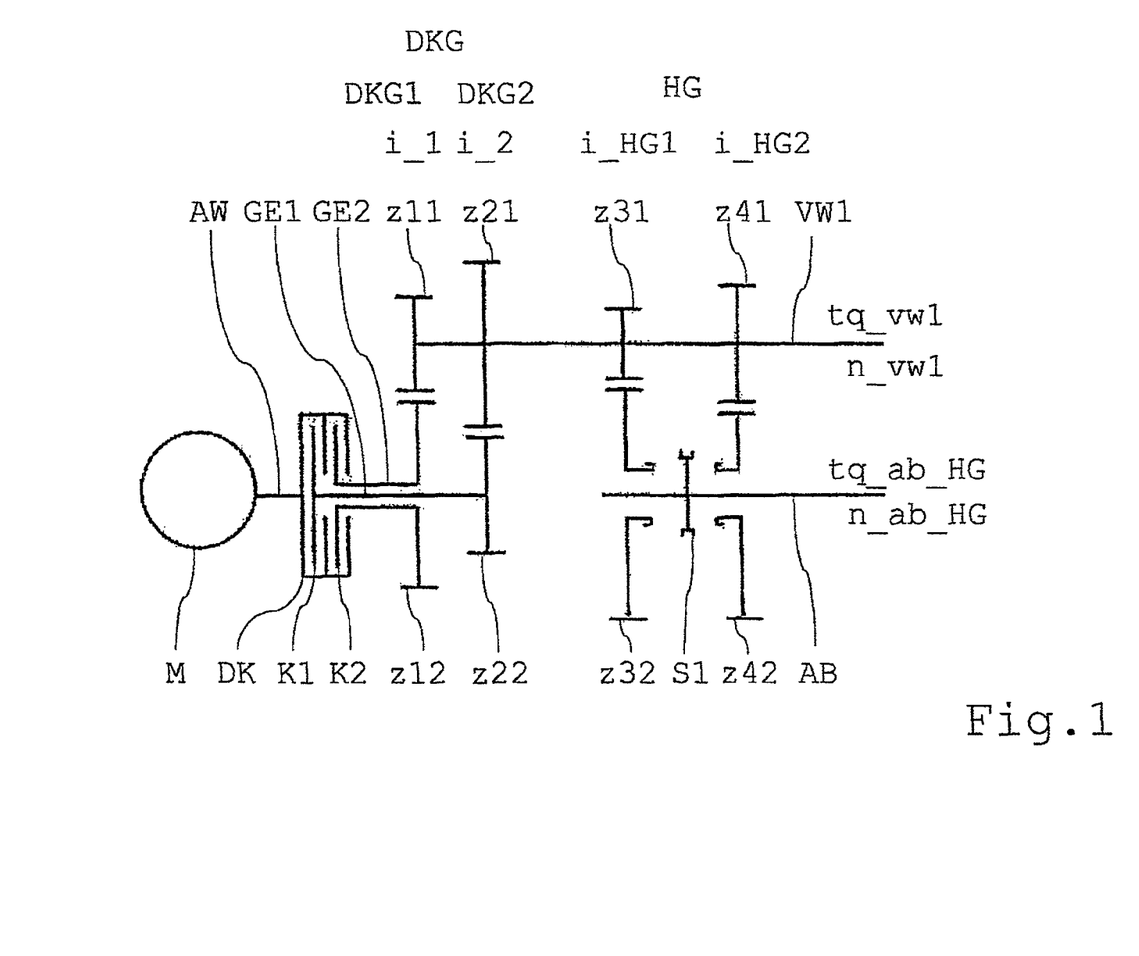
FIG. 1: A schematic representation of a partial double clutch transmission for carrying out a method according to the invention.

Accordingly, a partial double clutch transmission of countershaft design, shown in FIG. 1, comprises a first part-transmission in the form of a powershiftable double clutch transmission DKG and a second part-transmission in the form of a main transmission HG that shifts with traction force interruption. The double clutch transmission DKG comprises a double clutch DK with a first clutch K1 and a second clutch K2. A clutch input side is formed by a common clutch cage, which is connected to a driveshaft AW of a drive engine M in the form of an internal combustion engine.

A first transmission input shaft GE1 is connected solidly at its engine-side end to the first clutch K1 and at its transmission-side end to a gearwheel z22. The gearwheel z22 meshes with a gearwheel z21 arranged in a rotationally fixed manner on a countershaft VW1. The gearwheel pair z21/z22 forms a second input constant i_2, which together with the first clutch K1 forms a single-stage, second double clutch transmission branch DKG2. A second transmission input shaft GE2 is arranged in the form of a shorter, hollow shaft over the first transmission input shaft GE1. At its engine-side end it is connected solidly to the second clutch K2 and at its transmission-side end to a gearwheel z12. The gearwheel z12 meshes with a gearwheel z11 arranged rotationally fixed on the countershaft VW1. The gearwheel pair z11/z12 forms the first input constant i_1 upstream from the second input constant i_2, and together with the second clutch K2 forms a single-stage, first double clutch transmission branch DKG1. In its mode of operation the double clutch transmission DKG corresponds to a splitter group for a downstream transmission group.

Arranged in drive connection, downstream from the double clutch transmission DKG is a two-stage main transmission HG with a first main transmission gear i_HG1 and a second main transmission gear i_HG2. The first main transmission gear i_HG1 comprises a gearwheel z31 arranged in a rotationally fixed manner on the countershaft VW1, which meshes with a gearwheel z32 arranged to rotate on a drive output shaft AB. The second main transmission gear i_HG2 comprises a gearwheel z41 arranged rotationally fixed on the countershaft VW1, which meshes with a gearwheel z42 arranged to rotate on the output shaft AB. The loose wheels z32, z42 can alternately be connected rotationally fixed to the output shaft AB by means of an unsynchronized shifting element S1 in the form of a claw clutch. Applied to the countershaft VW1 is a drive torque tq_vw1 with a drive rotational speed n_vw1. At the output of the main transmission HG and hence of the transmission as a whole there is a resulting drive output torque tq_ab_HG with an output speed n_ab_HG, which acts upon the driven vehicle wheels or axles.

The partial double clutch transmission shown serves only as a simplified transmission structure for illustrating the structural principle of a partial double clutch transmission and the method according to the invention. A real double clutch transmission for a utility vehicle can, for example, comprise two two-gear double clutch transmission branches and a three-gear or four-gear main transmission, such that twelve or sixteen forward gears and at least one reverse gear are available.

Figure 2:
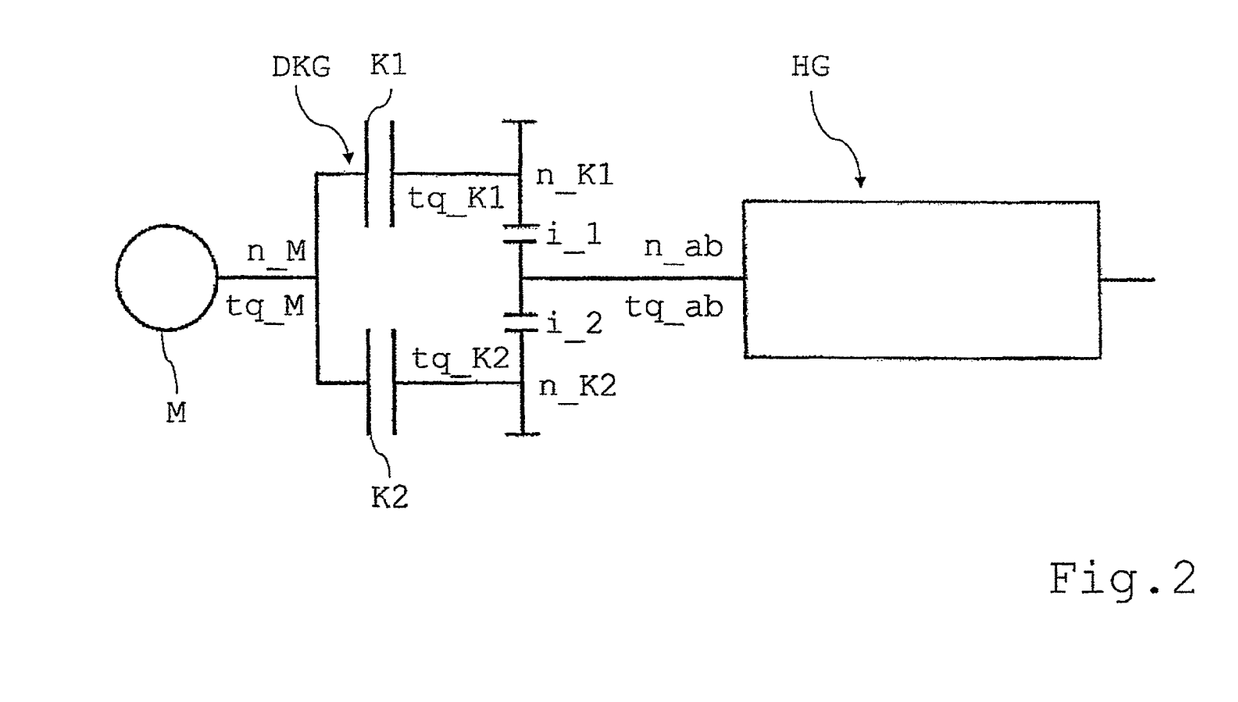
FIG. 2: A diagrammatic equivalent of the partial double clutch transmission.

To clarify the relevant torques and rotational speeds, FIG. 2 shows a diagrammatic equivalent of the transmission structure shown in FIG. 1. It shows a torque tq_M applied to the driveshaft AW at the drive engine. The drive engine M or its driveshaft AW rotates at an engine speed n_M. A clutch torque tq_K1 can be transmitted by the first clutch K1. During this the clutch output side rotates at a speed n_K1. A clutch torque tq_K2 can be transmitted by the second clutch K2 and during this the clutch output side rotates at a speed n_K2. At the output of the double clutch transmission DKG or input of the main transmission HG there is an output torque tq_ab and a corresponding output speed n_ab.

For the description of the method according to the invention, the relationship:

$$i_1 > i_2, \frac{i_1}{i_2} > 1, \frac{i_2}{i_1} < 1$$

should apply by definition for the clutches K1 and K2 and the associated gear ratios. Accordingly, the clutch K1 is defined as the clutch associated with the larger gear ratio. The above relationship applies for the double clutch transmission DKG whose transmission branches DKG1 and DKG2 each have only one gear i_1 and i_2 respectively, as shown in FIG. 1. For a double clutch transmission which has more than one gear in at least one of its two transmission branches, K1 and K2 are therefore determined afresh in each case as a function of the gear ratios chosen, so that K1 is always defined as the clutch associated with the larger gear ratio. Thus, the abbreviations K1 and K2 always denote the clutches which, according to the gear ratios chosen, are respectively the faster clutch (K1) and the slower clutch (K2) and which correspondingly have the higher and the lower gear ratio in the transmission respectively associated with them.

Figure 3:
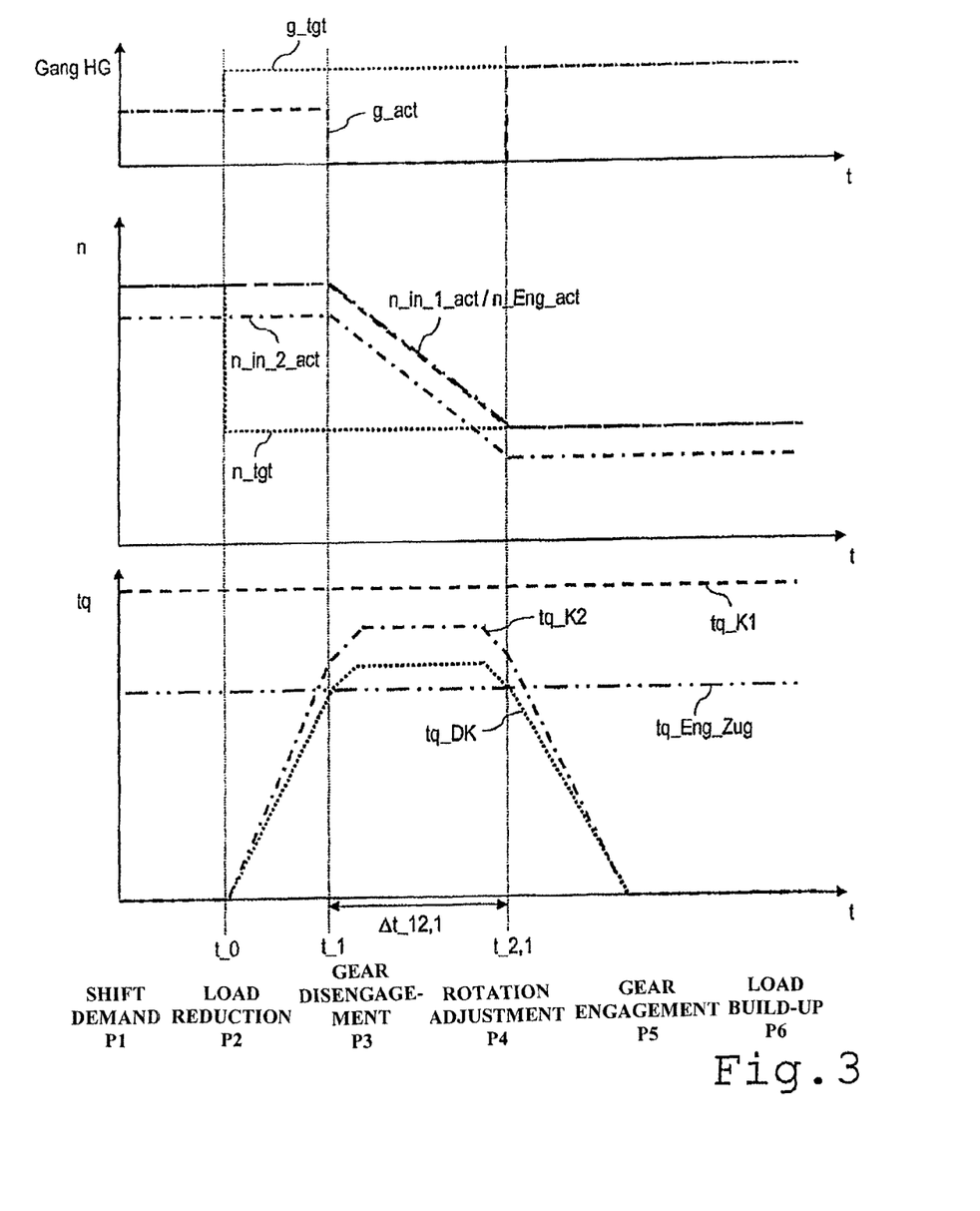
FIG. 3: A gear, rotational speed and torque diagram illustrating the method according to the invention.

FIG. 3 shows as an example an idealized traction upshift in such a partial double clutch transmission with a gearshift in the conventional transmission section HG, in which the necessary load reduction in the main transmission HG takes place by producing a torque that opposes the drive engine M by bracing the double clutch DK, such that the load-supporting clutch K1 does not change and correspondingly no gearshift takes place in the double clutch transmission section.

The shift sequence is divided into six phases P1 to P6. The top diagram shows the gear curves for the target gear g_tgt and the current or actual gear g_act. The middle diagram shows the variations overtime of the transmission input speeds n_in_1_act of the clutch K1 and n_in_2_act of the clutch K2, and the target speed n_tgt of the drive engine M or transmission input and the actual speed n_Eng_act of the drive engine M. The diagram at the bottom shows the variations over time of the torque tq_K1 and tq_K2 of the clutches K1 and K2, the resulting clutch or bracing torque tq_DK and the engine torque tq_Eng_Zug in traction operation.

From this it can be seen that the faster clutch by definition denoted K1, i.e. the clutch associated with the transmission branch DKG1 or DKG2 with the higher gear ratio i_1 and hence relating to the output rotational speed n_ab with the higher speed, being the load-supporting clutch both before and after the shift, remains always engaged or closed during the shift. Consequently, the speed n_Eng_act of the engine M corresponds to the input-side actual speed n_in_1_act of the clutch K1. Since the clutch K2 is the slower clutch, its input-side actual speed n_in_2_act is and remains lower than the actual speed n_in_1_act of the clutch K1 or the actual speed n_Eng_act of the engine M. Furthermore, a constant engine torque tq_Eng_Zug is assumed. At the engaged clutch K1 there is a constant clutch torque tq_K1. For the clutch K1 to remain securely engaged while the clutch K2 is operating with slip, the relationship:

$$|tq_{K1}| \geq |tq_{K2}| \cdot \frac{i_2}{i_1}$$

must be satisfied for the clutch torque at K1.

When a shift demand P1 occurs, at a time t_0 the load reduction in the main transmission HG begins. This is achieved by partially closing the clutch K2. Owing to the slipping torque of the clutch K2, during the load reduction in the second phase P2 of the shift the bracing torque tq_DK of the double clutch builds up in opposition to the engine torque tq_Eng_Zug. For the additional load torque tq_M1 on the engine M and the clutch torque tq_K2 at the clutch K2, the following respective relationships apply:

$$|tq_{M1}| = -|tq_{K2}| \cdot \left(1 - \frac{i_2}{i_1}\right)$$

and $$|tq_{K2}| = -|tq_{M1}| / \left(1 - \frac{i_1}{i_2}\right)$$

At time t_1 the bracing torque tq_DK corresponds to the engine torque tq_Eng_Zug, so the engine torque tq_Eng_Zug is fully compensated. Consequently, at the output of the double clutch transmission section DKG and the transmission input of the main transmission HG, during the next, shorter phase P3 the transmission is free from torque and the current gear g_act can be disengaged while free from load.

Once the gear g_act has been disengaged, the speed adaptation to the rotational speed n_tgt of the next or target gear g_tgt takes place within a time interval Δt_12,1 in the fourth shift phase P4. This is the time taken for active synchronization between time t_1 and a later time point t_2,1, without any waiting time since no shift takes place in the double clutch transmission DKG. If there is a shift in the double clutch transmission section DKG, there may be a delay if this has not yet been completed by the end of the load reduction, and then the target speed would not be reached until a later time t_12,2.

During the speed adaptation phase P4, apart from a transition zone at the beginning and at the end of the phase P4 the clutch torque tq_K2 of the clutch K2 and the double clutch torque or bracing torque tq_DK resulting therefrom are substantially constant. The speeds n_in_1_act and n_in_2_act of the clutches K1, K2 and the speed n_Eng_act of the engine decrease steadily. As soon as the load-supporting clutch after the shift, i.e. K1 in this example, has reached the target speed n_tgt, synchronization for the new target gear has been achieved and in phase P5, the target gear g_tgt can be engaged.

For the time until synchronicity is reached and the target gear g_tgt can be engaged when the clutch K1 is engaged and the clutch K2 is slipping, as in the above example, the following general estimate applies:

$$\Delta t_1 = \frac{\Delta \omega_{M1}}{tq_{Mot} + tq_{M1}} \cdot J_{M,Red,1}$$

in which Δω_M1 is the angular velocity difference of the shift at the engine, tq_Mot is the engine torque, tq_M1 is the load torque on the engine when K1 is engaged, and $$J_{M,Red,1} = J_M + \frac{J_{ab}}{i_1^2} + \frac{J_{K2} \cdot i_2^2}{i_1^2}$$

is the total mass moment of inertia of the engine referred (reduced) to the engine plane, with J_M=mass moment of inertia of the engine, J_ab=mass moment of inertia of the drive output and J_K2=mass moment of inertia of the slipping clutch K2.

In the final phase P6 of the traction shift, the load is built up in the new gear. For this, the slipping clutch K2 is fully opened so that the bracing torque tq_DK disappears and the engine torque tq_Eng_Zug is transmitted to the driven vehicle wheels. This completes the shifting process.

Shift sequences other than that shown in FIG. 3, for example ones with a gearshift in the double clutch transmission section DKG and/or with a change of the load-supporting clutch, can be carried out in an analogous manner. As boundary conditions for this, the following apply:

a) For performance-orientated traction upshifts, i.e. shifts optimized for short shifting times in which, with the help of the clutch bracing, the load reduction takes place without reducing the engine torque, as a rule the drive output speed n_ab at the double clutch transmission section DKG or the main transmission input after the shift, is lower than before the shift, i.e. $n_{ab,1} < n_{ab,0}$, provided that until the gear engagement the speed of the vehicle does not change significantly. In this case the faster clutch K1 is operated in an engaged condition and the slower clutch K2 is operated with slip. If there is a gear choice in the double clutch transmission section DKG, then in the currently unused double clutch transmission branch DKG1, DKG2 a gear is preferably selected such that the gear ratio is higher than that of the current gear. Thus, the respective torque-free clutch at the beginning of the shift is the faster clutch K1 and the engaged clutch during the load reduction.

b) For performance-orientated traction downshifts, as a rule the drive output speed n_ab at the double clutch transmission section DKG or the main transmission input is higher after the shift than before it, i.e. $n_{ab,1} > n_{ab,0}$. In this case the slower clutch K2 is operated in the engaged condition and the faster clutch K1 is operated with slip. The gear in the currently unused double clutch transmission branch DKG1, DKG2 is then preferably selected such that its gear ratio is lower than that of the current gear. Thus, the respective torque-free clutch at the beginning of the shift is the slower clutch K2 and the slipping clutch during the load reduction.

c) In the case when no appropriate gear is available, a gear in the currently unused double clutch transmission branch DKG1, DKG2 is selected, which results in the largest possible load torque on the engine.

Overall, in this way the drive engine can in each case be loaded sufficiently to maintain the supercharge pressure or at least to limit the loss of supercharge pressure, and in upshifts at the same time to achieve a relatively rapid speed adaptation to the target gear, in order to enable short shifting times while at the same time avoiding turbo lag.

List of Indexes

AB Drive output shaft
AW Drive input shaft
DK Double clutch
DKG Double clutch transmission
DKG1 Double clutch transmission branch
DKG2 Double clutch transmission branch
Δt_1 Rotational speed adaptation time, K1 engaged
Δt_12,1 Rotational speed adaptation time between t_1 and t_2,1
Δωw_M1 Angular speed difference at the engine, K1 engaged
g_tgt Target gear
g_act Actual gear
GE1 Transmission input shaft
GE2 Transmission input shaft
HG Main transmission
i_1 Input constant, gear ratio in DKG branch
i_2 Input constant, gear ratio in DKG branch
i_HG1 Main transmission gear
i_HG2 Main transmission gear
J_ab Mass moment of inertia of the drive output
J_K2 Mass moment of inertia of the clutch K2
J_M,Red,1 Mass moment of inertia, referred to engine plane, K1 engaged
J_M Mass moment of inertia of the engine
K1 Clutch of the double clutch
K2 Clutch of the double clutch
M Drive engine/internal combustion engine
n Rotational speed
n_ab Output speed at the DKG output, HG input
n_ab_HG Output speed of the main transmission
n_ab,0 Output speed before the shift
n_ab,1 Output speed after the shift
n_Eng_act Actual rotational speed of the drive engine
n_in_1_act Transmission input speed clutch K1
n_in_2_act Transmission input speed clutch K2
n_K1 Clutch output speed
n_K2 Clutch output speed
n_M Engine speed
n_tgt Target speed of the engine, transmission input
P1-P6 Shift sequence phases
S Shifting clutch, claw clutch
t Time
t_0 Time point
t_2,1 Time point
tq Torque
tq_Eng_Zug Engine torque during traction shift
tq_DK Double clutch torque/bracing torque
tq_K1 Torque at clutch K1
tq_K2 Torque at clutch K2 tq_M Torque on the engine
tq_M1 Load torque on the engine when K1 is engaged
tq_Mot Engine torque
VW1 Countershaft
z11 Gearwheel
z12 Gearwheel
z21 Gearwheel
z22 Gearwheel
z31 Gearwheel
z32 Gearwheel
z41 Gearwheel
z42 Gearwheel

The invention claimed is:

1. A method of controlling shifting in a partial dual-clutch transmission, having a first partial transmission designed as a dual-clutch transmission (DKG) with a dual clutch (DK) comprising a first clutch (K1) and a second clutch (K2) by which the dual-clutch transmission (DKG) is functionally connectable to a drive engine (M) designed as turbocharged internal combustion engine, and with a second partial transmission arranged in a drive-train, downstream from the dual-clutch transmission (DKG), and designed as a main transmission (HG) that shifts with traction force interruption, the method comprising the steps of:
at least partially engaging the first clutch (K1) and the second clutch (K2) during a traction shift involving a gearshift in the main transmission (HG), so as to brace the first clutch (K1) and the second clutch (K2) against one another and produce a bracing torque acting in opposition to the drive engine (M); and
either maintaining or building up a supercharge pressure of the drive engine during the traction shift with the torque acting in opposition to the drive engine, within a predetermined time after the traction shift.

2. The method according to claim 1, further comprising the step of building up the bracing torque of the dual clutch (DK), by operating one of the first and the second clutches (K1, K2) in an engaged condition and operating the other of the first and the second clutches with slip.

3. The method according to claim 1, further comprising the step of building up the bracing torque of the dual clutch (DK) by operating both of the first and the second clutches (K1, K2) with slip.

4. The method according to claim 1, further comprising the step of at the beginning of the traction shift, reducing a load in the main transmission (HG), in that the engine torque is reduced and, if necessary, disengaging one of the first and the second clutches (K1, K2) which is currently load-supporting, until a gear, currently engaged in the main transmission (HG), is disengaged while substantially free from load, and immediately after the gear disengagement the dual clutch (DK) is braced so that the torque, acting in opposition to the drive engine (M), is produced and a rotational speed adaptation to produce synchronization of the components of the gear to be engaged that must be shifted takes place, and after the new gear has been engaged a load build-up in the main transmission (HG) occurs, the bracing of the dual clutch (DK) is released by disengaging one of the first and the second clutches (K1, K2) while, as the load-supporting clutch in the new gear, the other one of the first and the second clutches (K1, K2) either is or remains engaged.

5. The method according to claim 4, further comprising the step of adapting the rotational speed place independently of any synchronous shifting clutches present in the main transmission (HG).

6. The method according to claim 1, further comprising the step of at the beginning of the traction shift, reducing a load in the main transmission (HG), in that the torque acting in opposition to the drive engine (M) is produced by bracing the dual clutch (DK), the currently not load-supporting one of the first and the second clutches (K1, K2) is brought to a slipping condition while the currently load-supporting clutch (K1, K2) is or remains engaged or at least partially engaged, until a gear currently engaged in the main transmission (HG) is disengaged while largely free from load, and after the gear is disengaged, a rotational speed adaptation to produce synchronization of the components of a new gear to be engaged that must be shifted occurs, and after the new gear is engaged, a load build-up in the main transmission (HG) occurs, and the bracing of the dual clutch (DK) is released by disengaging one of the first and the second clutches (K1, K2) while, as the load-supporting clutch in the new gear, the other one of the first and the second clutches (K1, K2) is or remains engaged.

7. The method according to claim 6, further comprising the step of during the speed adaptation, adjusting the clutch torques such that the speed of the target gear is reached with a specified dynamic.

8. The method according to claim 7, further comprising the step of specifying a maximum possible fuel injection quantity of the drive engine (M) by an engine control system, and adapting the rotational speed by regulating the bracing torque of the dual clutch (DK).

9. The method according to claim 7, further comprising the step of specifying a target rotation speed via an engine control system, and varying the bracing torque of the dual clutch (DK) so that the target speed is reached by the engine control system.

10. The method according to claim 1, further comprising the step of the supercharge-pressure-relevant bracing of the dual clutch (DK) during a traction shift always occurs if, after the traction shift, an effect of the driving resistance in a newly engaged gear exceeds a suction torque of the engine (M).

11. The method according to claim 1, further comprising the step of the supercharge-pressure-relevant bracing of the dual clutch (DK) during a traction shift always occurs if a power demand, indicated by a kick-down or an accelerator pedal position, exceeds a specified threshold value.

12. The method according to claim 11, further comprising the step of always performing the supercharge-pressure-relevant bracing of the dual clutch (DK) during the traction shift if this is recognized as appropriate with reference to a predetermined measure of comfort or performance.

13. The method according to claim 1, further comprising the step of only bracing the supercharge-pressure-relevant bracing of the dual clutch (DK) during the traction shift, with a currently determined clutch loading, a predetermined load reserve of at least one of the first and the second clutches (K1, K2) permits.

14. The method according to claim 13, further comprising the step of taking into account situations to be expected shortly for determination of a load reserve of one of the first and the second clutches (K1, K2) operated with slip.

15. The method according to claim 13, further comprising the step of when taking into account parameters which are at least one of clutch-specific, surroundings-specific and specifically relating to a field of use of the vehicle for determining the load reserve of one of the first and the second clutches (K1, K2) operated with slip.

16. A method of controlling shifting in a partial dual-clutch transmission of a utility vehicle, having a dual-clutch transmission (DKG) and a main transmission (HG), the dual-clutch transmission comprising first and second clutches (K1, K2) which functionally couple the dual-clutch transmission (DKG) to a turbocharged internal combustion engine, and the main transmission shifting with an interruption in traction force and being arranged in a drive-train downstream from the dual-clutch transmission, the method comprising the steps of:
- initiating a traction shift in the main transmission to shift from a current gear to a new gear;
- at least partially engaging both the first clutch and the second clutch to brace the first and the second clutches against one another and produce a torque which is acting in opposition to torque that is produced by the turbocharged internal combustion engine;
- disengaging the current gear;
- engage the new gear; and
- one of maintaining a supercharge pressure of the turbocharged internal combustion engine, during the traction shift, or building up the supercharge pressure of the turbocharged internal combustion engine shortly after the traction shift.

* * * * *